United States Patent
Qin

(10) Patent No.: US 9,803,032 B2
(45) Date of Patent: Oct. 31, 2017

(54) PROCESSES FOR THE PREPARATION OF HIGH-CIS POLYDIENES

(75) Inventor: Zengquan Qin, Copley, OH (US)

(73) Assignee: Bridgeston Corporation, Tokyo (JP)

( * ) Notice: Subject to any disclaimer, the term of this patent is extended or adjusted under 35 U.S.C. 154(b) by 325 days.

(21) Appl. No.: 14/116,779

(22) PCT Filed: May 8, 2012

(86) PCT No.: PCT/US2012/036901
§ 371 (c)(1),
(2), (4) Date: Nov. 11, 2013

(87) PCT Pub. No.: WO2012/154721
PCT Pub. Date: Nov. 15, 2012

(65) Prior Publication Data
US 2014/0073751 A1    Mar. 13, 2014

Related U.S. Application Data

(60) Provisional application No. 61/483,942, filed on May 9, 2011.

(51) Int. Cl.
*C08F 2/02* (2006.01)
*C08F 2/04* (2006.01)
*C08F 36/04* (2006.01)
*C08F 236/10* (2006.01)

(52) U.S. Cl.
CPC .................. *C08F 2/02* (2013.01); *C08F 2/04* (2013.01); *C08F 36/04* (2013.01); *C08F 236/10* (2013.01)

(58) Field of Classification Search
CPC ................................ C08F 2/00; C08F 251/00
See application file for complete search history.

(56) References Cited

U.S. PATENT DOCUMENTS

| | | |
|---|---|---|
| 3,170,905 A | 2/1965 | Uedea et al. |
| 3,170,907 A | 2/1965 | Ueda et al. |
| 3,312,752 A | 4/1967 | Schleimer |
| 3,329,734 A | 7/1967 | Schleimer et al. |
| 3,341,617 A | 9/1967 | Schleimer et al. |

(Continued)

FOREIGN PATENT DOCUMENTS

| | | |
|---|---|---|
| EP | 0093075 B1 | 12/1986 |
| EP | 1103567 A1 | 5/2001 |

(Continued)

OTHER PUBLICATIONS

Mensah, Laure, International Search Report with Written Opinion from PCT/US2012/036901, 10 pp. (Aug. 14, 2012).

(Continued)

*Primary Examiner* — Ling Choi
*Assistant Examiner* — Thuy-Ai N Nguyen
(74) *Attorney, Agent, or Firm* — Meredith E. Hooker; Jenny L. Sheaffer

(57) ABSTRACT

The present disclosure is directed towards a solution or bulk polymerization process for preparing high-cis polydienes that utilizes at least one vinyl aromatic compound as a molecular weight regulator. The disclosed solution or bulk polymerization processes are useful for preparing high-cis polydienes with a Mooney viscosity between 30 and 55 while allowing the use of lower amounts of catalyst.

31 Claims, 4 Drawing Sheets

Effect of varying amounts of styrene on Mooney viscosity.

(56) References Cited

U.S. PATENT DOCUMENTS

| | | |
|---|---|---|
| 3,352,839 A | 11/1967 | Lehr |
| 3,400,115 A | 9/1968 | Dawans et al. |
| 3,464,965 A | 9/1969 | Yasunaga et al. |
| 3,483,177 A | 12/1969 | Throckmorton et al. |
| 3,528,957 A | 9/1970 | Throckmorton et al. |
| 3,674,759 A | 7/1972 | Yamawaki et al. |
| 3,725,492 A | 4/1973 | Ukita et al. |
| 3,755,284 A | 8/1973 | Yamawaki et al. |
| 3,843,618 A | 10/1974 | Yagi et al. |
| 3,844,974 A | 10/1974 | Throckmorton |
| 3,852,373 A | 12/1974 | Hesse et al. |
| 3,856,764 A | 12/1974 | Throckmorton et al. |
| 4,054,612 A | 10/1977 | Yagi et al. |
| 4,102,817 A | 7/1978 | Throckmorton et al. |
| 4,155,880 A | 5/1979 | Saltman et al. |
| 4,224,426 A | 9/1980 | Odar |
| 4,303,769 A | 12/1981 | Odar |
| 4,314,045 A | 2/1982 | Odar |
| 4,383,097 A | 5/1983 | Castner et al. |
| 4,522,988 A | 6/1985 | Kang et al. |
| 4,562,171 A | 12/1985 | Kang |
| 4,983,695 A | 1/1991 | Kuzma et al. |
| 5,100,982 A | 3/1992 | Castner |
| 5,397,851 A | 3/1995 | Knauf et al. |
| 5,397,951 A | 3/1995 | Uchida et al. |
| 5,412,045 A | 5/1995 | Osman et al. |
| 5,451,646 A | 9/1995 | Castner |
| 5,453,471 A | 9/1995 | Bernier et al. |
| 5,637,661 A | 6/1997 | Castner et al. |
| 5,652,304 A | 7/1997 | Calderon et al. |
| 5,686,543 A | 11/1997 | Yasuda et al. |
| 5,698,643 A | 12/1997 | Donbar et al. |
| 5,811,499 A | 9/1998 | Castner |
| 5,859,156 A | 1/1999 | Calderon et al. |
| 5,955,553 A | 9/1999 | Oziomek et al. |
| 6,013,746 A | 1/2000 | Jang et al. |
| 6,066,705 A | 5/2000 | Calderon et al. |
| 6,437,205 B1 | 8/2002 | Miller et al. |
| 6,562,917 B2 | 5/2003 | Jang et al. |
| 6,582,917 B1 | 6/2003 | Beier |
| 6,586,542 B2 | 7/2003 | Jang et al. |
| 6,887,956 B2 | 5/2005 | van der Huizen et al. |
| 7,081,504 B2 | 7/2006 | Rachita et al. |
| 7,288,611 B2 | 10/2007 | Jiang et al. |
| 2008/0255327 A1 | 10/2008 | Qin et al. |
| 2009/0143551 A1* | 6/2009 | Qin .................. B01J 31/0201 526/143 |
| 2011/0172369 A1* | 7/2011 | Yan .................. C08C 19/44 525/333.2 |

FOREIGN PATENT DOCUMENTS

| | | |
|---|---|---|
| EP | 1788003 A1 | 5/2007 |
| WO | 2009146018 A1 | 12/2009 |

OTHER PUBLICATIONS

Office Action dated Nov. 3, 2014 in Chinese counterpart application 201280027573.2.

Communication under Rule 71(3) from EPO in EP counterpart application 12723309 (dated Feb. 6, 2015).

Communication under Rules 161(1) and 162 from EPO in EP counterpart application 12723309 (dated Jan. 8, 2014).

Response to EPO in EP counterpart application 12723309 (dated Jun. 24, 2014).

Office Action dated Feb. 4, 2016 in Chinese counterpart application 201280027573.2.

* cited by examiner

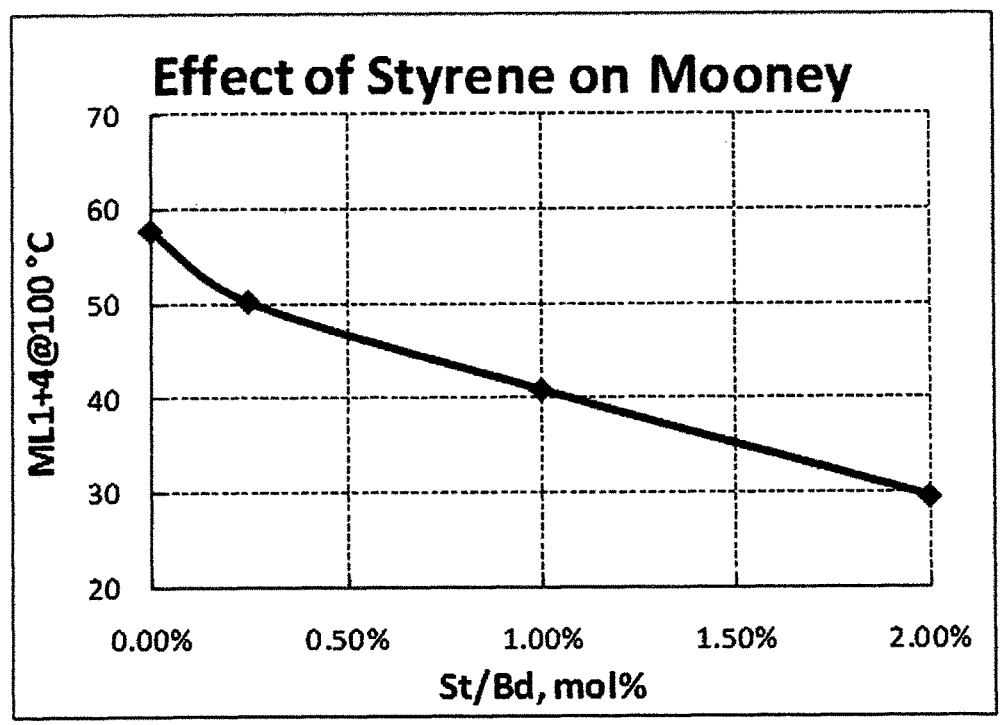
Figure 1: Effect of varying amounts of styrene on Mooney viscosity.

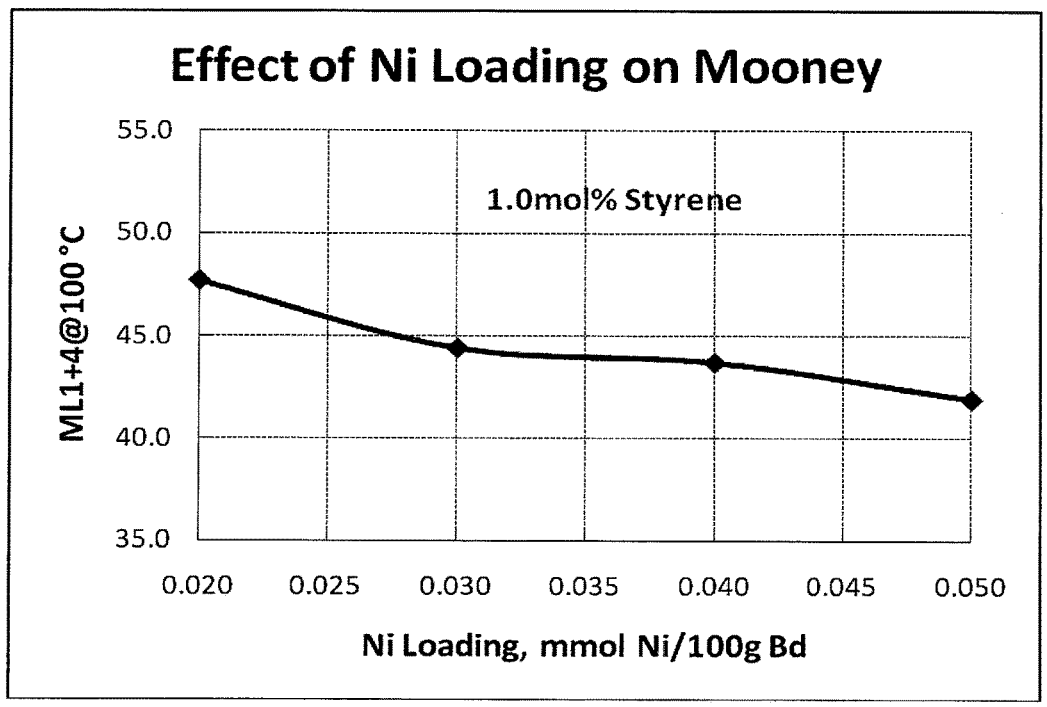
Figure 2: Effect of varying amounts of nickel-containing catalyst compound on Mooney viscosity, while using a constant amount of vinyl aromatic compound.

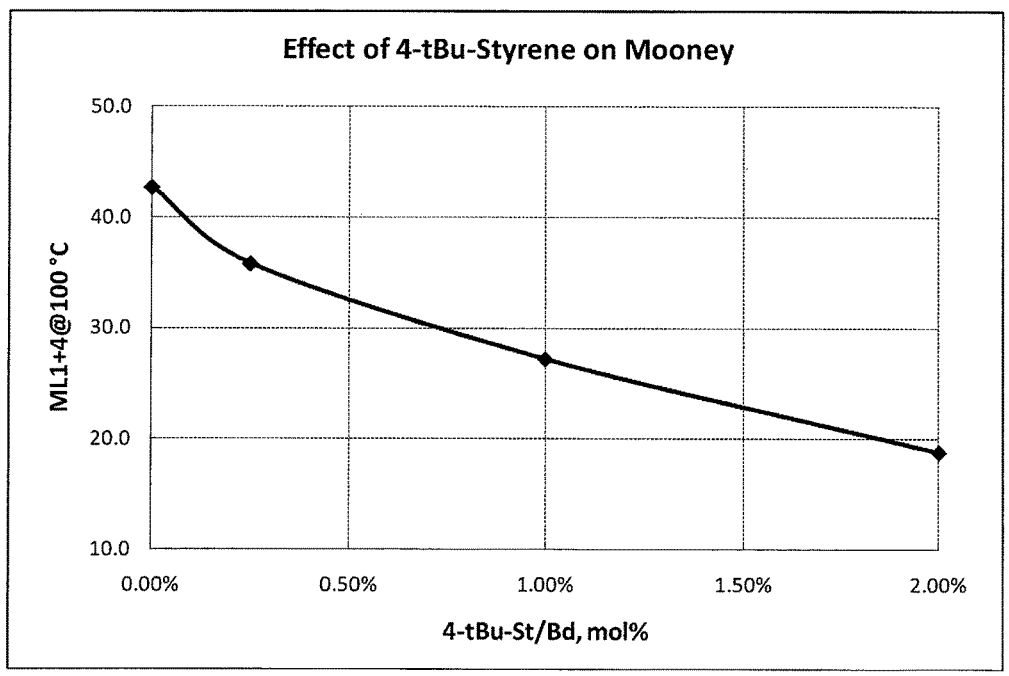
Figure 3: Effect of utlizing varying amounts of 4-tertbutylstyrene on Mooney viscosity while using a constant amount of catalyst.

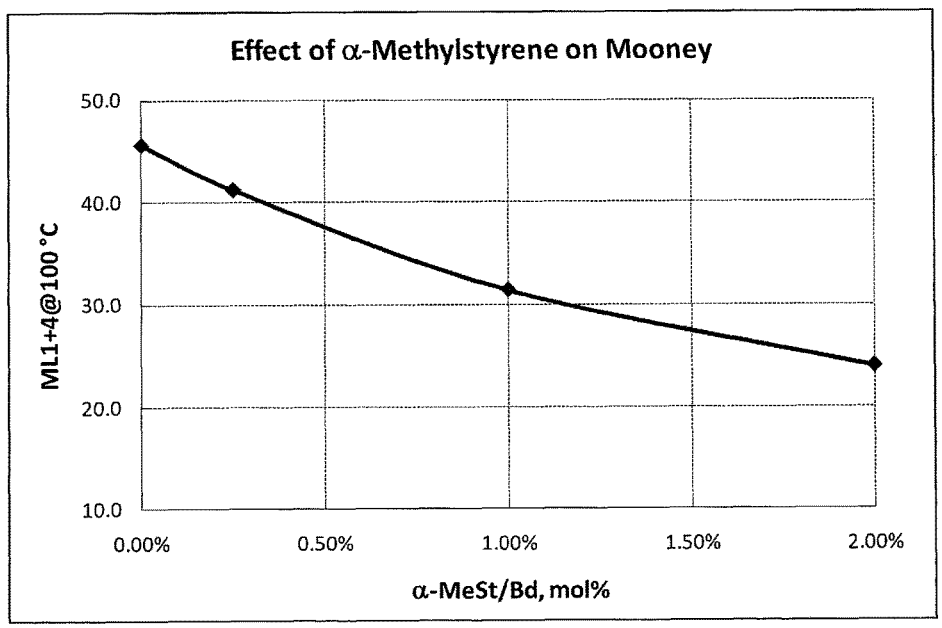
Figure 4: Effect of utilizing varying amounts of α-methylstyrene on Mooney viscosity while using a constant amount of catalyst.

PROCESSES FOR THE PREPARATION OF HIGH-CIS POLYDIENES

FIELD OF INVENTION

The disclosure relates to processes for the preparation of high-cis polydienes.

BACKGROUND

Various polymerization processes have been developed for polymerizing high-cis polydienes. Some such processes have utilized nickel-based catalyst systems to produce high-cis polydienes with a range of Mooney viscosities. Generally, such processes have been conducted in solution, bulk, and gas phase polymerization processes.

SUMMARY OF THE INVENTION

The present disclosure is directed towards a solution or bulk polymerization process for preparing high-cis polydienes that utilizes at least one vinyl aromatic compound as a molecular weight regulator resulting in a high-cis polydiene with a lower molecular weight and lower Mooney viscosity as compared to a high-cis polydiene made using the same polymerization process but without the addition of the at least one vinyl aromatic compound. Moreover, the use of the at least one vinyl aromatic compound allows for use of a lower amount of catalyst in the solution or bulk polymerization process. The solution or bulk polymerization process makes use of a catalyst system comprising (a) a nickel compound, (b) an organoaluminum, organomagnesium, or organozinc compound, and (c) a fluorine-containing compound. The catalyst system is used in a process comprising: providing the catalyst system, at least one conjugated diene monomer, and at least one vinyl aromatic compound, mixing the components, and polymerizing the mixture to obtain a high-cis polydiene. The at least one conjugated diene monomer contains less than 20 carbon atoms (i.e., 4-19 carbon atoms), and the at least one vinyl aromatic compound is provided in a total amount of 0.01 to 2 mole % per mole of monomer (per total moles of the at least one conjugated diene monomer). The resulting high-cis polydiene has a mooney viscosity between 30 and 55 and contains no more than 1 mole % of vinyl aromatic compound per mole of conjugated diene monomer incorporated within the high-cis polydiene. Additional embodiments include processes where the polymerization of the high-cis polydiene is one step in an overall process for making vulcanizable rubber compositions and tire components including such compositions. The present solution or bulk polymerization process reduces polymerization costs by allowing for polymerization with a reduced amount of catalyst. Further, the present solution or bulk polymerization process facilitates the production of high-cis polydienes having decreased amounts of catalyst residue (i.e., preparation of a catalyst-free or near-catalyst-free high-cis polydiene).

BRIEF DESCRIPTION OF THE DRAWINGS

FIG. 1 shows the effect of utilizing varying amounts of vinyl aromatic compound (i.e., styrene) on Mooney viscosity in the polymerization process.

FIG. 2 shows the effect of utilizing varying amounts of nickel-containing compound on Mooney viscosity in a polymerization process that also makes use of (a constant amount of) a vinyl aromatic compound.

FIG. 3 shows the effect of utilizing varying amounts of 4-tert-butylstyrene on Mooney viscosity in the polymerization process.

FIG. 4 shows the effect of utilizing varying amounts of α-methylstyrene on Mooney viscosity in the polymerization process.

DETAILED DESCRIPTION

The present disclosure is directed towards a process for preparing high-cis polydienes that utilizes at least one vinyl aromatic compound as a molecular weight regulator resulting in a high-cis polydiene with a lower molecular weight and lower Mooney viscosity as compared to a high-cis polydiene made using the same polymerization process but without the addition of the at least one vinyl aromatic compound. Moreover, the use of the at least one vinyl aromatic compound allows for use of a lower amount of catalyst in the solution or bulk polymerization process. The process makes uses of a catalyst system comprising (a) a nickel compound, (b) an organoaluminum, organomagnesium, or organozinc compound, and (c) a fluorine-containing compound. The catalyst system is used in an overall process comprising providing the catalyst system, at least one conjugated diene monomer, and at least one vinyl aromatic compound, mixing the components to obtain a mixture, and polymerizing the mixture to obtain a high-cis polydiene. The at least one conjugated diene monomer contains less than 20 carbon atoms (i.e., 4 to 19 carbon atoms), and the at least one vinyl aromatic compound is provided in a total amount of 0.01 to 2 mole % per mole of monomer. The resulting high-cis polydiene has a mooney viscosity between 30 and 55 and contains no more than 1 mole % of vinyl aromatic compound per mole of conjugated diene monomer incorporated within the high-cis polydiene. Additional embodiments include processes where the polymerization of the high-cis polydiene is one step in an overall process for making vulcanizable rubber compositions and tire components including such compositions.

Generally, high-cis polydienes contain both cis and trans linkages between carbon atoms. The term "high-cis," as used herein, means a cis-1,4-linkage content of 85% or greater in the resulting polydiene. In certain embodiments, the high-cis polydiene that results from the processes disclosed herein may have a cis-1,4-linkage content of 90% or greater, 92% or greater; 95% or greater; or even 97% or greater.

The term "solution polymerization" when used herein means a polymerization process carried out in some type of organic solvent-based solution, as opposed to processes such as gas or emulsion polymerization. Accordingly, gas phase polymerization is not within the scope of the solution and bulk polymerization processes of this disclosure. The "solvent" in which the polymerization reaction takes place may be the monomer that is being polymerized (e.g., 1,3-butadiene), in which case the polymerization is referred to as bulk polymerization. In certain bulk polymerization embodiments, the polymerization system contains less than 5% by weight of a separate solvent. Alternatively, a separate solvent or solvents, or a combination of conjugated diene monomer and separate organic solvent(s) may be utilized for the polymerization reaction, each of these types of polymerizations being considered a solution polymerization. Thus, as used herein, the term solution polymerization is intended to include processes carried out using a combination of at least one conjugated diene monomer and separate organic solvent(s) as "solvent" and processes where the combined conjugated diene monomer and separate organic solvent(s) content consists of a much greater amount of separate solvent(s) whereas the term bulk polymerization is intended to includes processes carried out using predominately monomer as "solvent." The combined conjugated diene monomer and separate organic solvent(s) content is considered to be predominately monomer when it contains at least 80% monomer by weight, based upon the combined weight of conjugated diene monomer and separate organic solvent. The at least one vinyl aromatic compound and other ingredients such as catalyst components are not included in the weight calculation. In certain embodiments, a solution predominately consists of monomer when the solution contains at least 85% monomer by weight; or at least 90% monomer by weight; or at least 95% monomer by weight; or even or at least 97% monomer by weight. Bulk polymerization also encompasses a polymerization where no separate organic solvent is utilized. Solution or bulk polymerization may be conducted in a continuous, semi-continuous, or batch polymerization process.

The term "substantially devoid," when used in describing the contents of a solution, is understood to mean that the solution is at least 95% solvent or monomer (combined) by weight. In other words, the solution contains less than 5% ingredients by weight other than solvent or monomer.

The solution or bulk polymerization processes disclosed herein make use of a catalyst system comprising (a) a nickel-containing compound, (b) an organoaluminum, organomagnesium, or organozinc compound, and (c) a fluorine-containing compound. This catalyst system may be prepared or utilized in various ways, as discussed further herein. It should be understood that one or more separate compounds may be utilized for each of the (a), (b) and (c) catalyst components.

The components of the catalyst system used in the solution or bulk polymerization processes disclosed herein can be provided in varying amounts. In one embodiment, the nickel-containing compound is used in the process in an amount of 0.01 to 0.2 mmol Ni/phgm, the molar ratio of catalyst compound (b) to catalyst compound (a) is 5:1 to 100:1 and the molar ratio of catalyst compound (c) to catalyst compound (a) is 4:1 to 150:1. In another embodiment, the nickel-containing compound is used in the process in an amount of 0.01 to 0.1 mmol Ni/phgm, the molar ratio of catalyst compound (b) to catalyst compound (a) is 5:1 to 50:1 and the molar ratio of catalyst compound (c) to catalyst compound (a) is 4:1 to 75:1. (The abbreviation phgm as used herein refers to per hundred grams monomer.) In an additional embodiment, the nickel-containing compound is used in the process in an amount of 0.02 to 0.1 mmol Ni/phgm, the molar ratio of catalyst compound (b) to catalyst compound (a) is 10:1 to 50:1 and the molar ratio of catalyst compound (c) to catalyst compound (a) is 8:1 to 75:1.

The nickel-containing compound used in the catalyst system may generally be any nickel salt or nickel salt of an organic acid containing from 1 to 20 carbon atoms. The nickel atom in the nickel-containing compounds can be in various oxidation states including but not limited to the 0, +2, +3, and +4 oxidation states. Thus, the nickel-containing compound can in certain instances be nickel metal or a nickel-containing alloy. Alternatively, the nickel can be present in a positive oxidation state such as in a salt or organic-containing nickel compound.

Nickel-containing compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel .beta.-diketonates, nickel alkoxides or aryloxides, nickel halides, nickel pseudo-halides, nickel oxyhalides, and organonickel compounds.

Nickel carboxylates can include nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Nickel carboxylate borates may include compounds defined by the formulae $(RCOONiO)_3B$ or $(RCOONiO)_2B$ (OR), where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel (II) neodecanoate borate, nickel (II) hexanoate borate, nickel (II) naphthenate borate, nickel (II) stearate borate, nickel (II) octoate borate, nickel (II) 2-ethylhexanoate borate, and mixtures thereof. Specific examples of nickel carboxylate borates include Nickel organophosphates can include nickel dibutyl phosphate, nickel dipentyl phosphate, nickel dihexyl phosphate, nickel diheptyl phosphate, nickel dioctyl phosphate, nickel bis(1-methylheptyl) phosphate, nickel bis(2-ethylhexyl) phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl) phosphate, nickel (1-methylheptyl) (2-ethylhexyl) phosphate, and nickel (2-ethylhexyl) (p-nonylphenyl) phosphate.

Nickel organophosphonates can include nickel butyl phosphonate, nickel pentyl phosphonate, nickel hexyl phosphonate, nickel heptyl phosphonate, nickel octyl phosphonate, nickel (1-methylheptyl) phosphonate, nickel (2-ethylhexyl) phosphonate, nickel decyl phosphonate, nickel dodecyl phosphonate, nickel octadecyl phosphonate, nickel oleyl phosphonate, nickel phenyl phosphonate, nickel (p-nonylphenyl) phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) (1-methylheptyl) phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl)phosphonate, nickel (2-ethylhexyl)butylphosphonate, nickel (1-methylheptyl) (2-ethylhexyl)phosphonate, nickel (2-ethylhexyl)(1-methylheptyl)phosphonate, nickel (2-ethylhexyl)(p-nonylphenyl) phosphonate, and nickel (p-nonylphenyl)(2-ethylhexyl) phosphonate.

Nickel organophosphinates can include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel (1-methylheptyl)(2-ethylhexyl)phosphinate, and nickel (2-ethylhexyl)(p-nonylphenyl)phosphinate.

Nickel carbamates can include nickel dimethylcarbamate, nickel diethylcarbamate, nickel diisopropylcarbamate, nickel dibutylcarbamate, and nickel dibenzylcarbamate.

Nickel dithiocarbamates can include nickel dimethyldithiocarbamate, nickel diethyldithiocarbamate, nickel diisopropyldithiocarbamate, nickel dibutyldithiocarbamate, and nickel dibenzyldithiocarbamate.

Nickel xanthates include nickel methylxanthate, nickel ethylxanthate, nickel isopropylxanthate, nickel butylxanthate, and nickel benzylxanthate.

Nickel .beta.-diketonates can include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Nickel alkoxides or aryloxides can include nickel methoxide, nickel ethoxide, nickel isopropoxide, nickel 2-ethylhexoxide, nickel phenoxide, nickel nonylphenoxide, and nickel naphthoxide.

Nickel halides can include nickel fluoride, nickel chloride, nickel bromide, and nickel iodide. Nickel pseudo-halides include nickel cyanide, nickel cyanate, nickel thiocyanate, nickel azide, and nickel ferrocyanide. Nickel oxyhalides include nickel oxyfluoride, nickel oxychloride and nickel oxybromide. Where the nickel halides, nickel oxyhalides or other nickel-containing compounds contain labile fluorine or chlorine atoms, the nickel-containing compounds can also serve as the fluorine-containing compound or the chlorine-containing compound. A Lewis base such as an alcohol can be used as a solubility aid for this class of compounds.

The term organonickel compound may refer to any nickel compound containing at least one nickel-carbon bond. Organonickel compounds include bis(cyclopentadienyl)nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl) (pentadienyl) nickel, bis(1,5-cyclooctadiene)nickel, bis(allyl)nickel, bis(methallyl)nickel, and bis(crotyl)nickel.

Some representative examples of nickel-containing compounds suitable for use in the processes disclosed herein include, but are not limited to, nickel benzoate, nickel acetate, nickel naphthenate, nickel octanoate, nickel neodecanoate, bis($\alpha$-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\eta^3$-allypnickel, bis($\pi$-cycloocta-1,5-diene)nickel, bis($\eta^3$-allyl nickel trifluoroacetate), nickel tetracarbonyl, nickel boroacylate, and mixtures thereof.

Additional nickel-containing compounds suitable for use in the disclosed processes are well known to those skilled in the art. Additional examples of suitable nickel compounds not specifically listed above, but nonetheless suitable for the processes disclosed herein are listed in U.S. Patent Application Publication 20080255327, herein incorporated by reference. Mixtures and combinations of the foregoing nickel compounds may be utilized.

The catalyst system used in the solution or bulk polymerization processes discussed herein also includes at least one organometallic compound in the form of one or more of an organoaluminum, organomagnesium, and organozinc compound. The organoaluminum, organomagnesium, and organozinc compound(s) may be utilized in the various above-disclosed amounts. Additional examples of suitable organoaluminum, organomagnesium and organozinc compounds not specifically listed above, but nonetheless suitable for the processes disclosed herein are listed in U.S. Pat. No. 7,820,580 and U.S. Patent Application Publication 20080255327, herein incorporated by reference.

Suitable organoaluminum compounds for use in the catalyst system generally include compounds containing at least one carbon-aluminum bond. In one or more embodiments, each organoaluminum compound may include an aluminum bonded to a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. Additional hydrocarbyl groups suitable for use in the processes disclosed herein are known to those skilled in the art.

Suitable organoaluminum compounds for use in the catalyst system also include organoalkylaluminum compounds, where aluminum is bonded to an alkyl compound. Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups. Additional alkyl groups suitable for use in the organoaluminum compound of the catalyst component and other suitable organoaluminum compounds are known to those skilled in the art. Mixtures and combinations of the foregoing organoaluminum compounds may also be employed.

Suitable organo aluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, dipropylaluminum, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichlorides include ethylaluminum dichloride, n-propylaluminum dichloride, isopropylaluminum dichloride, n-butylaluminum dichloride, isobutylaluminum dichloride, and n-octylaluminum dichloride.

Other suitable organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

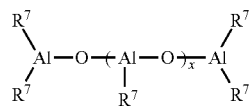

and oligomeric cyclic aluminoxanes that can be represented by the general formula:

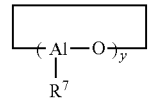

where x is an integer of 1 to about 100, preferably about 10 to about 50; y is an integer of 2 to about 100, preferably about 3 to about 20; and where each $R^7$, which may be the same or different, is a mono-valent organic group that is attached to the aluminum atom via a carbon atom. Preferably, each $R^7$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

Suitable organomagnesium compounds for use in the catalyst system include compounds containing at least one carbon-magnesium bond. In one or more embodiments, each organomagnesium compound may include a magnesium bonded to a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. Additional hydrocarbyl groups suitable for use in the organomagnesium compounds and other suitable organomagnesium compounds are known to those skilled in the art.

Suitable organomagnesium compounds for use in the catalyst system also include organoalkylmagnesium compounds, where magnesium is bonded to an alkyl compound. Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups. Additional alkyl groups suitable for use in the organomagnesium compound are known to those skilled in the art. Of course, mixtures and combinations of the foregoing organomagnesium compounds may also be employed.

One class of organomagnesium compounds that can be utilized may be represented by the formula $MgR^2{}_2$, where each $R^2$, which may be the same or different, is a monovalent organic group, with the proviso that the group is attached to the magnesium atom via a carbon atom. In one or more embodiments, each $R^2$ may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Examples of suitable organomagnesium compounds include dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium may be readily available and may be soluble in aliphatic and cycloaliphatic hydrocarbon solvents.

Another class of organomagnesium compounds that are suitable for use in the catalyst system are those represented by the formula $R^3MgX$ and include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Suitable organozinc compounds for use in the catalyst system include compounds containing at least one carbon-zinc bond. In one or more embodiments, each organozinc compound may include a zinc bonded to a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. Additional hydrocarbyl groups suitable for use in the organozinc compound are known to those skilled in the art.

Suitable organozinc compounds for use in the catalyst system also include organoalkylzinc compounds, where zinc is bonded to at least one alkyl group. Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups. Mixtures and combinations of the foregoing organozinc compounds may also be employed. Additional alkyl groups suitable for use in the organozinc compound are known to those skilled in the art.

Fluorine-containing compounds which may be utilized as component (c) of the catalyst systems herein include, but are not limited to, boron trifluoride complexes with ethers, alcohols or mixtures thereof; hydrogen fluoride and hydrogen fluoride complexes with ethers, alcohols or mixtures thereof. Mixtures and combinations of the foregoing fluorine-containing compounds may also be employed. In one embodiment the fluorine-containing compounds for use in the catalyst system are the boron trifluoride complexes. Additional fluorine-containing compounds suitable for use in the processes disclosed herein are known to those skilled in the art.

Suitable types of fluorine-containing compounds include, but are not limited to, elemental fluorine, halogen fluorides, hydrogen fluoride, organic fluorides, inorganic fluorides, metallic fluorides, organometallic fluorides, and mixtures thereof. In one or more embodiments, the complexes of the fluorine-containing compounds with a Lewis base such as ethers, alcohols, water, aldehydes, ketones, esters, nitrites, or mixtures thereof may be employed. Specific examples of these complexes include the complexes of boron trifluoride and hydrogen fluoride with a Lewis base.

Suitable halogen fluorides include, but are not limited to, iodine monofluoride, iodine trifluoride, and iodine pentafluoride.

Suitable organic fluorides include, but are not limited to, t-butyl fluoride, allyl fluoride, benzyl fluoride, fluoro-diphenylmethane, triphenylmethyl fluoride, benzylidene fluoride, methyltrifluorosilane, phenyltrifluorosilane, dimethyldifluorosilane, diphenyldifluorosilane, trimethylfluorosilane, benzoyl fluoride, propionyl fluoride, and methyl fluoroformate.

Suitable inorganic fluorides include, but are not limited to, phosphorus trifluoride, phosphorus pentafluoride, phosphorus oxyfluoride, boron trifluoride, silicon tetrafluoride, arsenic trifluoride, selenium tetrafluoride, and tellurium tetrafluoride.

Metallic fluorides may include tin tetrafluoride, aluminum trifluoride, antimony trifluoride, antimony pentafluoride, gallium trifluoride, indium trifluoride, titanium tetrafluoride, and zinc difluoride.

Suitable organometallic fluorides include, but are not limited to, dimethylaluminum fluoride, diethylaluminum fluoride, methylaluminum difluoride, ethylaluminum difluoride, methylaluminum sesquifluoride, ethylaluminum sesquifluoride, isobutylaluminum sesquifluoride, methylmagnesium fluoride, ethylmagnesium fluoride, butylmagnesium fluoride, phenylmagnesium fluoride, benzylmagnesium fluoride, trimethyltin fluoride, triethyltin fluoride, di-t-butyltin difluoride, dibutyltin difluoride, and tributyltin fluoride.

Generally, the conjugated diene aspect of the conjugated diene monomer(s) used in the processes discussed herein refers to the presence of at least two double bonds that are separated by a single bond. The solution or bulk polymerization processes discussed herein utilize at least one conjugated diene monomer containing less than 20 carbon atoms (i.e., 4 to 19 carbons). Examples of conjugated diene monomers suitable for use in the disclosed processes include, but are not limited, to 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof. In one embodiment, the conjugated diene monomer is 1,3-butadiene, resulting in polybutadiene after polymerization. Additional conjugated diene monomers are known to those skilled in the art and may also be utilized.

The solution or bulk polymerization processes discussed herein make use of at least one vinyl aromatic compound during polymerization. Generally, vinyl aromatic compounds are compounds containing both a vinyl group and an aromatic group. The at least one vinyl aromatic compound, in combination with the catalyst system disclosed herein, is believed to assist in regulating the molecular weight of the resulting high-cis polydiene while requiring lower amounts than other molecular weight regulators. Various vinyl aromatic compounds are suitable for use in the processes disclosed herein as long as the compound retains the aromatic group and vinyl group core structure. In other words, various substituents can be added to the aromatic ring and/or to the vinyl carbon. In one embodiment, the at least one vinyl aromatic compound contains 8 to 20 carbon atoms. In additional embodiments, the at least one vinyl aromatic compound used in the polymerization processes may include, without limitation: styrene, alpha-methyl styrene, 2-methyl styrene, 3-methyl styrene, 4-methyl styrene, 4-tert-butyl styrene, 4-alpha-dimethyl styrene, alpha-phenyl styrene, styrene derivatives containing a para-ether linkage wherein the styrene derivatives contain no more than 20 carbon atoms, and combinations thereof. In one embodiment, the only vinyl aromatic compound provided is styrene. Additional vinyl aromatic compounds suitable for use in the processes disclosed herein are known to those skilled in the art.

The at least one vinyl aromatic compound may be utilized in various amounts in the solution or bulk polymerization processes disclosed herein. In one embodiment, the amount of vinyl aromatic compound used in the process is 0.01 to 2 mole % per mole of monomer. The amount of vinyl aromatic compound used, 0.01 to 2 mole % per mole of monomer, is in relation to the monomer provided before any chemical reaction occurs. In an alternative embodiment, the amount of vinyl aromatic compound is present in a total amount of 0.01 to 1 mole % per mole of monomer. In another embodiment, the amount of vinyl aromatic compound is present in a total amount of 0.01 to 0.5 mole % per mole of monomer. In yet another embodiment, the amount of vinyl aromatic compound is present in a total amount of 0.01 to 0.1 mole % per mole of monomer.

The catalyst system used in the solution or bulk polymerization processes may be prepared or utilized in various ways such as discussed herein.

In one embodiment, the catalyst system is formed in situ. Formation in situ entails adding the (a) nickel compound, (b) organoaluminum, organomagnesium, or organozinc compound, and (c) fluorine-containing compound to a container, reactor or other receptacle that contains the at least one vinyl aromatic compound and the at least one conjugated diene monomer. In one embodiment, the catalyst ingredients are added to the at least one conjugated diene monomer, and then the at least one vinyl aromatic compound is added to the mixture of catalyst ingredients and at least one conjugated diene monomer. (In each instance where one ingredient or set of ingredient is discussed as being added to another ingredient or set of ingredients, it is intended that the first ingredient or set of ingredients may be added to the second or the second set may be added to the first, unless indicated otherwise.) The addition may be conducted in either a stepwise or simultaneous manner. In other words, the (a), (b), and (c) compounds may be added all at the same time or sequentially. When adding the catalyst ingredients in a stepwise manner, the sequence in which the catalyst ingredients (a), (b) an (c) are added is not critical, but the addition order may impact the properties of the resulting high-cis polydiene.

In a preferred embodiment, the catalyst system may be formed by first adding the at least one conjugated diene monomer (e.g., 1,3-butadiene), then adding the (b) organoaluminum, organomagnesium, or organozinc compound, then adding the (a) nickel compound, and then adding the (c) fluorine-containing compound to the container, reactor or other receptacle.

In another embodiment, the catalyst system may be formed by first adding the (a) nickel compound, (b) organoaluminum, organomagnesium, or organozinc compound, and (c) fluorine-containing compound to a container, reactor or other receptacle containing at least the at least one vinyl aromatic compound to form a mixture. The container, reactor or other receptacle containing the at least one vinyl aromatic compound may consist solely of the at least one vinyl aromatic compound or a combination of the at least one vinyl aromatic compound and solvent(s). The mixture is then added to a solution containing the at least one conjugated diene monomer.

In another embodiment, the catalyst system may be formed by first adding the (a) nickel compound, (b) organoaluminum, organomagnesium, or organozinc compound, and (c) fluorine-containing compound to a container, reactor or other receptacle containing a portion of the at least one conjugated diene monomer to form a mixture and then adding the mixture to a solution containing the remainder of the at least one conjugated diene monomer and the at least one vinyl aromatic compound.

In yet another embodiment, the catalyst system may be formed by mixing the (a) nickel compound and the (b) organoaluminum, organomagnesium, or organozinc compound to form a mixture, adding the mixture to a container, reactor or other receptacle containing the at least one conjugated diene monomer and the at least one vinyl aromatic compound. The (c) fluorine-containing compound can be added to the at least one conjugated diene monomer before adding the mixture to the at least one conjugated diene monomer, simultaneously with the addition of the mixture to the at least one conjugated diene monomer, or after the addition of the mixture to the at least one conjugated diene monomer.

In additional embodiments, the (a), (b), and (c) compounds may be pre-formed into a catalyst system outside the polymerization system at an appropriate temperature, which is generally from −20° C. to 80° C., and the resulting catalyst system is then added to the monomer solution.

Similarly, in other embodiments, the catalyst system may be pre-formed in the presence of at least one conjugated diene monomer. That is, the catalyst ingredients (a), (b) and (c) are pre-mixed in the presence of a small amount of conjugated diene monomer at an appropriate temperature, which is generally from −20° C. to 80° C. The amount of conjugated diene monomer that is used for pre-forming the catalyst can range from 1 to 500 moles per mole, more preferably from 5 to 250 moles per mole, and even more preferably from 10 to 100 moles per mole of the nickel compound. The resulting catalyst system is then added to the remainder of the conjugated diene monomer that is to be polymerized. The pre-formed catalyst may be formed by adding the catalyst ingredients and at least one conjugated diene monomer either in a stepwise or simultaneous manner. When adding the catalyst ingredients and conjugated diene monomer in a stepwise manner, the sequence in which the catalyst ingredients and conjugated diene monomer are added is not critical, but, again, the addition order may impact the properties of the resulting high-cis polydiene.

Organic solvents may be used to facilitate the polymerization processes disclosed herein. In this regard, the organic solvents disclosed herein are not specific to production of the catalyst system. Thus, various organic solvents (i.e., one or a mixture of organic solvents) may serve to dissolve the catalyst system components and/or other ingredients, or may simply serve as a carrier in which the catalyst system and/or other ingredients may be suspended or exist. The organic solvent is preferably inert to the catalyst system in that it does not participate in the polymerization reaction. Useful organic solvents include hydrocarbon solvents such as aromatic hydrocarbons, aliphatic hydrocarbons, and cycloaliphatic hydrocarbons. Non-limiting examples of suitable aromatic hydrocarbon solvents include benzene, toluene, xylenes, ethylbenzene, diethylbenzene, mesitylene, and the like. Non-limiting examples of suitable aliphatic hydrocarbon solvents include n-pentane, n-hexane, n-heptane, n-octane, n-nonane, n-decane, isopentane, hexanes, isohexanes, isopentanes, isooctanes, 2,2-dimethylbutane, petroleum ether, kerosene, petroleum spirits, and the like. And, non-limiting examples of suitable cycloaliphatic hydrocarbon solvents include cyclopentane, cyclohexane, methylcyclopentane, methylcyclohexane, and the like. Commercial mixtures of the above hydrocarbon solvents may also be used. For environmental reasons, aliphatic and cycloaliphatic solvents may be preferred in certain instances. Additional organic solvents suitable for use in the processes disclosed herein are known to those skilled in the art.

In certain embodiments, an amount of organic solvent or solvent in addition to the amount of organic solvent that may be used in preparing the catalyst system is preferably added to the polymerization system. The additional organic solvent(s) may be the same as or different from the organic solvent(s) used in preparing the catalyst system. An organic solvent that is inert with respect to the catalyst system employed to catalyze the at least one conjugated diene monomer may be selected. Exemplary hydrocarbon solvents have been set forth above. Unless otherwise indicated, the concentration of the monomer to be polymerized is not limited to any particular amount when a given solvent or solvent mixtures are employed.

In one embodiment, the polymerization mixture includes at least 20% by weight of solvent based upon the total weight of the polymerization system and said solvent includes an aliphatic solvent. (The total weight of the polymerization system includes all monomer and solvent but does not include any of the catalyst components.) In another embodiment, the polymerization mixture includes at least 40% by weight of solvent based upon the total weight of the polymerization system and said solvent includes an aliphatic solvent. In a different embodiment, the polymerization mixture includes at least 60% by weight of solvent based upon the total weight of the polymerization system and said solvent includes an aliphatic solvent. In yet another embodiment, the polymerization mixture includes at least 80% by weight of solvent based upon the total weight of the polymerization system and said solvent includes an aliphatic solvent.

In another series of embodiments, the polymerization mixture includes less than 20% by weight of separate solvent based on the total weight of the polymerization mixture; less than 10% by weight of separate solvent based on the total weight of the polymerization mixture; or less than 5% by weight of separate solvent based on the total weight of the polymerization mixture.

The polymerization may be carried out as a batch process, a continuous process, or a semi-continuous process. In the semi-continuous process, monomer is intermittently charged as needed to replace monomer that has already polymerized. The polymerization is conducted under anaerobic conditions by using an inert protective gas such as nitrogen, argon or helium, with moderate to vigorous agitation. The polymerization temperature may vary widely from a low temperature, such as −10° C. or below, to a high temperature such as 130° C. or above, with a preferred temperature range being from 20° C. to 120° C. The heat of polymerization may be removed by external cooling, cooling by evaporation of the monomer or the solvent, or a combination of the two methods. Although the polymerization pressure employed may vary widely, a preferred pressure range is from 1 atmosphere to 10 atmospheres.

Once a desired conversion is achieved, the polymerization can be stopped by adding a polymerization stopping agent to inactivate the catalyst. Typically, the period of polymerization is from 20 minutes to 24 hours and will depend on other polymerization conditions such as temperature as well as the choice of catalyst. Typically, the stopping agent employed is a protic compound, which includes, but is not limited to, an alcohol, a carboxylic acid, an inorganic acid, water, or a mixture thereof.

When the polymerization has been stopped, high-cis polydiene product can be recovered from the polymerization mixture by utilizing conventional procedures of desolventization and drying. For instance, the high-cis polydiene may be isolated from the polymerization mixture by coagulating the polymerization mixture with an alcohol such as methanol, ethanol, or isopropanol, followed by filtration, or by steam distilling the solvent and the unreacted monomer, followed by filtration. The isolated high-cis polydiene product is then dried to remove residual amounts of solvent and water. Alternatively, the high-cis polydiene may be isolated from the polymerization mixture by directly drum drying the high-cis polydiene cement. The high-cis polydiene product can be dried using any convenient method such as vacuum drying, drum drying, extruder drying, and the like.

The high-cis-1,4-polydienes prepared according to the processes disclosed herein have a cis-1,4 content of 85% or greater; alternatively 90% or greater; alternatively at least 92%; or at least 95%, or even at least 97%. The 1-4 cis- and trans-bond content of polydienes can be determined by subjecting a polymer sample dissolved in $CS_2$ to FTIR and the cis- and trans-bond contents referred to herein were determined by such a method.

In certain embodiments, the number average molecular weight ($M_n$) of these high-cis polydienes ranges from 50,000 to 150,000; in other embodiments from 60,000 to 120,000, and in other embodiments from 65,000 to 85,000, as determined by using gel permeation chromatography (GPC) calibrated with polystyrene standards and Mark-Houwink constants for the high-cis polydiene in question.

In certain embodiments, the weight average molecular weight ($M_w$) of the high-cis polydienes produced according to the disclosed processes ranges from 150,000 to 450,000, in other embodiments from 200,000 to 400,000, and in other embodiments from 250,000 to 350,000, as determined by GPC. However, high-cis polydienes having a molecular weight below 150,000 or above 450,000 are also within the scope of the disclosure.

The polydispersity ($M_w/M_n$) of the high-cis polydienes produced according to the disclosed processes is preferably from 3 to 6, and in other embodiments from 4 to 5.

The high-cis-1,4-polydienes resulting from the polymerization processes disclosed herein will have a mooney viscosity ($ML_{1+4}$) between 30 and 55. In certain embodiments, the polydienes disclosed herein will have a mooney viscosity between 40 and 50. In certain embodiments, the polydienes disclosed herein will have a mooney viscosity between 43 and 47. The Mooney viscosity ($ML_{1+4}$) of the polymers reported herein was determined at 100° C. by using an Alpha Technologies Mooney viscometer with a large rotor, a one-minute warm-up time, and a four-minute running time.

The high-cis-1,4-polydienes resulting from the polymerization processes disclosed herein will contain no more than 1 mole % of vinyl aromatic compound per mole of monomer contained with the high-cis polydiene. In alternative embodiments, the high-cis-1,4-polydienes will contain no more than 0.5 to 0.8 mole % of vinyl aromatic compound per mole of monomer contained with the high-cis polydiene. In another embodiment, the high-cis-1,4-polydienes will contain no more than 0.2 to 0.5 mole % of vinyl aromatic compound per mole of monomer contained with the high-cis polydiene.

The disclosed solution or bulk polymerization processes are particularly useful in processes for producing tire components. In other words, the high-cis-1,4-polydienes produced according to the solution or bulk polymerization processes disclosed herein are useful in rubber compositions ultimately used in various tire components. These tire components can be prepared by using the high-cis polydienes produced by the processes disclosed herein or together with other rubbery elastomers. Other rubbery elastomers that may be used include natural and synthetic elastomers. The synthetic elastomers typically derive from the polymerization of conjugated diene monomers, optionally in combination with one or more monomers.

A multitude of rubber curing agents may be employed in processes for producing tire components, including sulfur or peroxide-based curing systems. Curing agents are described in 20 Kirk-Othmer, Encyclopedia of Chemical Technology, 365-468, (3rd Ed. 1982), particularly Vulcanization Agents and Auxiliary Materials, 390-402, and A. Y. Coran, Vulcanization in Encyclopedia of Polymer Science and Engineering, (2nd Ed. 1989), which are incorporated herein by reference. Vulcanizing agents may be used alone or in combination.

Other ingredients that may be employed in processes for producing tire components include accelerators, oils, waxes, scorch inhibiting agents, processing aids, zinc oxide, tackifying resins, reinforcing resins, fatty acids such as stearic acid, peptizers, various fillers and one or more additional rubbers.

These processes for producing tire components are useful for producing tire components such as treads, subtreads, sidewalls, body ply skins, bead filler, and the like. Preferably, high-cis polydienes are employed in tread or sidewall formulations. In one or more embodiments, these formulations may include from 10 to 100% by weight, in other embodiments from 35 to 90% by weight, and in other embodiments from 50 to 80% by weight of the high-cis polydiene based on the total weight of the rubber within the formulation.

In order to demonstrate the practice of the present disclosure, the following examples have been prepared and tested. The examples should not, however, be viewed as limiting the scope of the invention. The claims will serve to define the invention.

EXAMPLES

The Mooney viscosity ($ML_{1+4}$) of the polymers were determined at 100° C. by using a Alpha Technologies Mooney viscometer with a large rotor, a one-minute warm-up time, and a four-minute running time. The molecular weight (Mn, Mw and Mp-peak Mn of GPC curve) and molecular weight distribution (Mw/Mn) were determined by GPC. The microstructure (cis, trans and vinyl contents) of the polymer was determined by FTIR.

Example 1 (Comparative)

To a dry bottle purged with nitrogen was added a hexane and 1,3-butadiene (Bd) blend in hexane, resulting in 300 grams of 15.0 weight % Bd hexane solution. To this solution was charged a preformed solution mixed in the order of 0.75 mL Bd solution (21.5 weight % Bd in hexane), 0.83 mL triisobutylaluminum (TIBA) solution (0.68 M), and 0.45 mL nickel boroacylate (NiOB) solution (0.050 M). Then boron trifluoride hexanol solution (1.0M, 0.62 mL) was added to the bottle. The bottle was placed in an 80° C. water-bath for 40 minutes. Then, the reaction mixture was treated with isopropanol containing 2,6-di-tert-butyl-4-methylphenol (BHT) in order to deactivate the catalyst, coagulate and stabilize the polymers. The polybutadiene was then dried in a drum-dryer at 120° C. The polymer properties are listed in Table 1.

Examples 2-4

The experiments of Examples 2-4 were carried out as in Example 1 except that differing amounts of styrene were added before addition of the catalyst components, as shown in Table 1 and FIG. 1.

TABLE 1

| | Examples | | | |
|---|---|---|---|---|
| | 1 | 2 | 3 | 4 |
| Styrene:Bd, mole % | 0.00% | 0.25% | 1.00% | 2.00% |
| Styrene:Bd, weight % | 0.00% | 0.48% | 1.93% | 3.85% |
| Ni Catalyst | NiOB | NiOB | NiOB | NiOB |
| Mmol/phgm | 0.05 | 0.05 | 0.05 | 0.05 |
| Al:Ni | 25 | 25 | 25 | 25 |
| B:Al | 1.1 | 1.1 | 1.1 | 1.1 |
| RXN Temperature, ° C. | 80 | 80 | 80 | 80 |
| RXN Time, min | 40 | 40 | 40 | 40 |
| Conversion, % | 95.3% | 93.6% | 93.1% | 96.2% |
| ML1 + 4 @ 100 C. | 57.7 | 50.2 | 40.8 | 29.4 |
| T80 | 7.72 | 6.32 | 5.04 | 3.92 |
| GPC Analysis | | | | |
| Mn | 78,877 | 75,769 | 67,309 | 59,591 |
| Mw | 391,383 | 350,077 | 321,367 | 282,972 |
| Mp | 241,225 | 215,380 | 185,931 | 156,010 |
| Mw/Mn | 4.96 | 4.62 | 4.77 | 4.75 |
| Microstructure (FTIR) | | | | |
| cis-1,4; % | 96.20% | 96.09% | 96.13% | 96.07% |
| trans-1,4; % | 1.73% | 1.80% | 1.80% | 1.86% |
| Vinyl, % | 2.07% | 2.11% | 2.07% | 2.06% |

As shown in FIG. 1, the Mooney viscosity of the polymer is inversely proportional to the amount of styrene provided when styrene is provided in 0 to 2 St/Bd mole %.

Additionally, as shown by Examples 2 and 3 in Table 1, a high-cis polymer with a desirable Mooney viscosity in the range of 30 to 50 is obtained when 0.25 to 1.00 Styrene:Bd mole % is utilized to conduct the polymerization process. Of note, Example 2 yielded a polymer with a 13% lower Mooney viscosity than Example 1, and Example 3 yielded a polymer with a 29% lower Mooney viscosity than Example 1.

Examples 5-8

The experiments of Examples 5-8 were carried out as in Example 1 except that 1.0 mole % styrene to Bd was added into butadiene solution, followed by addition of differing amounts of catalyst components as shown in Table 2 and FIG. 2.

TABLE 2

| | Examples | | | |
|---|---|---|---|---|
| | 5 | 6 | 7 | 8 |
| Styrene:Bd, mole % | 1.0% | 1.0% | 1.0% | 1.0% |
| Styrene:Bd, weight % | 1.93% | 1.93% | 1.93% | 1.93% |
| Ni Catalyst | NiOB | NiOB | NiOB | NiOB |
| Mmol/phgm | 0.050 | 0.040 | 0.030 | 0.020 |
| Al:Ni | 25.0 | 25.0 | 25.0 | 25.0 |
| B:Al | 1.10 | 1.10 | 1.10 | 1.10 |
| RXN Temperature, ° C. | 80 | 80 | 80 | 80 |
| RXN Time, min | 40 | 40 | 40 | 40 |
| Conversion, % | 94.0% | 93.6% | 90.4% | 85.6% |
| ML1 + 4 @ 100 C. | 41.90 | 43.70 | 44.40 | 47.70 |
| T80 | 4.35 | 4.37 | 4.61 | 4.84 |
| GPC Analysis | | | | |
| Mn | 67,846 | 70,839 | 76,774 | 75,593 |
| Mw | 320,941 | 336,530 | 348,751 | 361,670 |
| Mp | 183,010 | 210,144 | 207,728 | 212,742 |
| Mw/Mn | 4.73 | 4.75 | 4.54 | 4.78 |
| Microstructure (FTIR) | | | | |
| cis-1,4; % | 96.19% | 96.39% | 96.42% | 96.55% |
| trans-1,4; % | 1.78% | 1.68% | 1.63% | 1.55% |
| Vinyl, % | 2.03% | 1.94% | 1.96% | 1.90% |

As shown in FIG. 2, the Mooney viscosity of the polymer is inversely proportional to the amount of nickel compound provided when nickel is loaded in 0.02 to 0.05 mmol Ni/100 g Bd. However, the Mooney viscosity only increased slightly when nickel loading decreased from 0.05 to 0.03 mmol Ni/100 g Bd, which made it possible to produce lower Mooney polymer with less catalyst.

Additionally, as shown in Table 2, a high-cis polymer with a desirable Mooney viscosity is obtained when 0.030 mmol/phgm NiOB is utilized to conduct the polymerization process. Of note, Example 7 yielded a polymer with a Mooney viscosity that within 2% of a Mooney viscosity of 45, Example 6 yielded a polymer with a Mooney viscosity that within 5% of a Mooney viscosity of 45, and Example 8 yielded a polymer with a Mooney viscosity that is within 10% of 45. Thus, utilizing 0.025 to 0.045 mmol/phgm NiOB also produced high-cis polymers with a desirable Mooney viscosity.

Example 9 (Comparative) and Example 10

To the bottom of a 6 gallon jacketed reactor were continuously added two streams, Stream 1 and Stream 2. Stream 1 (6.74 lb/hr) was a mixture of hexane and $BF_3$-hexanol complex solution in hexane (6.0 weight %). Stream 2 (28.26 lb/hr) was a mixture of 1,3-butadiene (Bd) solution in hexane (22.0 weight %), nickel boroacylate (NiOB) solution (0.005 M), and triisobutylaluminum (TIBA) solution (0.15 M). Addition rate of the streams was set to achieve a residence time of 60 minutes and a concentration of 17 weight % Bd in hexane. NiOB solution addition rate was controlled to achieve 0.1 mmol Ni per hundred grams Bd. The addition rate of the TIBA solution was controlled to maintain a molar Al:Ni ratio of 14, and the addition rate of the $BF_3$-hexanol solution was controlled to maintain a molar B:Al ratio of 1.2. Reactor jacket temperature was held at 96° C. Polymerization was allowed to reach steady-state conditions, at which point a sample of high-cis polydiene cement sample was taken from downstream of the top of the reactor. An approximately 1000 mL sample of high-cis polydiene cement was taken from the reactor and treated with approximately 100 mL mixture of hexane, 20% isopropanol (by weight), and 8% BHT (by weight) in order to deactivate the catalyst and stabilize the polymer. The high-cis polydiene sample was then drum-dried. The amount of the isopropanol/BHT solution was selected to be large enough to sample the polymer cement under the surface of this liquid, which helps prevent reaction of the cement with air, resulting in more accurate results.

Next, to the ingredients remaining in the reactor, a styrene solution in hexane (6.2 weight %) was added to the Stream 1 feed to achieve styrene addition at 1.0 weight % of total Bd added (0.5 styrene:Bd, mole %). After steady-state conditions were reached, an approximately 1000 mL sample of high-cis polydiene cement was taken from the reactor and treated with approximately 100 mL mixture of hexane, 20% isopropanol (by weight), and 8% BHT (by weight) in order to deactivate the catalyst and stabilize the polymer. The high-cis polydiene sample was then drum-dried. The amount of the isopropanol/BHT solution was selected to be large enough to sample the polymer cement under the surface of this liquid, which helps prevent reaction of the cement with air, resulting in more accurate results. The results are listed in Table 3.

TABLE 3

| | Examples | |
|---|---|---|
| | 9 | 10 |
| Styrene:Bd, mole % | 0.0 | 0.5 |
| Styrene:Bd, weight % | 0.0 | 1.0 |
| NiOB, mmol/phgm | 0.1 | 0.1 |
| Al:Ni | 14 | 14 |
| B:Al | 1.2 | 1.2 |
| Jacket temp, ° C. | 96 | 96 |
| Top reactor temp,, ° C. | ~93 | ~93 |
| % conversion | 85.8 | 88.6 |
| ML1 + 4 (100° C.) | 42.00 | 34.50 |
| T80 | 6.30 | 5.50 |
| GPC Analysis | | |
| Mn | 73,809 | 69,417 |
| Mw | 285,837 | 263,557 |
| Mp | 165,945 | 147,952 |
| Mw/Mn | 3.87 | 3.80 |
| Microstructure (FTIR) | | |
| % cis | 95.74 | 95.63 |
| % trans | 1.63 | 1.71 |
| % vinyl | 2.63 | 2.66 |

Example 10, when evaluated against Example 9, shows a decrease in the resulting Mooney viscosity of the polymer that is achieved with addition of styrene. The Mooney viscosity of Example 10 is 82% of the Mooney viscosity of Example 9.

Example 11

To a dry 2-gallon jacketed reactor purged with nitrogen was added hexane and then 1,3-butadiene (Bd) blend in hexane, resulting in 8.0 lb (3629 g) of 18.0% Bd solution in hexane. The solution inside the reactor was maintained at 25° C. Then, to a nitrogen-purged bottle was added 9.0 grams of Bd solution in hexane (21.5 weight % Bd, 13.2 mL triisobutylaluminum (TIBA) solution (0.68 M) and nickel boroacylate (NiOB) solution (0.050 M, 7.2 mL). The resulting orange solution was immediately charged into the reactor, followed by addition of 2.1 mL boron trifluoride hexanol solution (4.73 M ($BF_3$)) Then, the jacket temperature of the reactor was set at 88° C. Polymerization was allowed to take place for one hour, at the end of which time the reaction mixture was treated with isopropanol containing 2,6-di-tert-butyl-4-methylphenol (BHT) in order to deactivate the catalyst and coagulate the polybutadiene. The polybutadiene was then dried in a drum-dryer at 120° C. The results are listed in Table 4.

Examples 12 and 13

To a dry 2-gallon reactor purged with nitrogen was added hexane and then 1,3-butadiene (Bd) blend in hexane, resulting in 8.0 lb (3629 g) of 18.0% Bd solution in hexane. Then, 18.9 grams of styrene solution in hexane (34.0 weight % styrene) was added and the solution was maintained at 25° C. To a nitrogen-purged bottle was added 8.2 grams of Bd solution in hexane (21.5 weight % Bd, 12.0 mL triisobutylaluminum (TIBA) solution (0.68 M) and nickel boroacylate (NiOB) solution (0.050 M, 6.5 mL). The resulting orange solution was immediately charged into the reactor, followed by boron trifluoride hexanol solution (4.73 M, 1.9 mL). Then the jacket temperature of the reactor was set at 88° C. Polymerization was allowed to take place for one hour, at the end of which time the reaction mixture was treated with isopropanol containing 2,6-di-tert-butyl-4-methylphenol (BHT) in order to deactivate the catalyst and coagulate the polybutadiene. The polybutadiene was then dried in a drum-dryer at 120° C. The results are listed in the Table 4.

The experiment of Example 13 was carried out as in Example 12 except that 0.040 mmol/phgm NiOB was used instead of 0.050 mmol/phgm NiOB as shown in Table 4.

TABLE 4

| | Examples | | |
|---|---|---|---|
| | 11 | 12 | 13 |
| Styrene: Bd, mole % | 0.00% | 0.50% | 0.50% |
| Styrene: Bd, weight % | 0.00% | 0.96 | 0.96 |
| NiOB, mmol/phgm | 0.055 | 0.050 | 0.040 |
| Al: Ni | 25 | 25 | 25 |
| B: Al | 1.1 | 1.1 | 1.1 |
| Jacket Temp, ° C. | 88 | 88 | 88 |
| Peak Batch Temp, ° C. | 100.6 | 102.2 | 101.1 |
| Conversion, % | 91% | 91% | 91% |
| ML1 + 4@100° C. | 49.30 | 35.0 | 45.1 |
| T80 | 6.08 | 5.80 | 5.58 |
| GPC Analysis | | | |
| Mn | 75,526 | 69,721 | 74,151 |
| Mw | 316,584 | 294,231 | 317,020 |
| Mp | 185,564 | 171,228 | 186,584 |
| Mw/Mn | 4.19 | 4.22 | 4.28 |
| Microstructure (FTIR) | | | |
| cis-1,4; % | 96.22% | 95.92% | 96.16% |
| trans-1,4; % | 1.84% | 1.94% | 1.82% |
| Vinyl, % | 1.94% | 2.14% | 2.01% |

Examples 12 and 13, as shown in Table 4, show that the addition of styrene allows for the reduction of catalyst without adversely impacting the resulting polydiene's Mooney viscosity or microstructure. As shown by Example 13, when compared to Example 12, it is possible to achieve a 29% higher Mooney viscosity when using 20% less catalyst in the presence of styrene. Example 13, when compared to Example 11, also shows less catalyst is needed to achieve a high-cis polydiene when styrene is utilized in the polymerization process. Additionally, as shown by Example 13 in Table 4, a high-cis polymer with a desirable Mooney viscosity is obtained when 0.040 mmol/phgm NiOB is utilized to conduct the polymerization process, though it is possible to obtain similar high-cis polydienes using higher amounts of catalyst.

As shown by the above examples, varying vinyl aromatic compound content along with amount of catalyst impacts the Mooney viscosity of the resulting high-cis polydiene such that it is possible to obtain a high-cis polydiene with a desirable Mooney viscosity while using less catalyst.

Example 14 (Comparative)

To a dry bottle purged with nitrogen was added a hexane and 1,3-butadiene (Bd) blend in hexane, resulting in 300 grams of 15.0 weight % Bd hexane solution. To this solution was charged a preformed solution mixed in the order of 0.75 mL Bd solution (21.3 weight % Bd in hexane), 0.83 mL triisobutylaluminum (TIBA) solution (0.68M), and 0.45 mL nickel boroacylate (NiOB) solution (0.050 M). Then, boron trifluoride hexanol solution (1.0 M, 0.62 mL) was added to the bottle. The bottle was placed in an 80° C. water-bath for 40 minutes. Then, the reaction mixture was treated with isopropanol containing 2,6-di-tert-butyl-4-methylphenol (BHT) in order to deactivate the catalyst, coagulate and stabilize the polymers. The polybutadiene was then dried in a drum-dryer at 120° C. The polymer properties are listed in Table 1.

Examples 15-17

The experiments of Examples 15-17 were carried out as in Example 14 except that differing amounts of 4-tert-butylstyrene were added before addition of the catalyst components, as shown in Table 5 and FIG. 3.

TABLE 5

| | Examples | | | |
|---|---|---|---|---|
| | 14 | 15 | 16 | 17 |
| 4-tert-Butylstyrene: Bd, mole % | 0.00% | 0.25% | 1.00% | 2.00% |
| 4-tert-Butylstyrene: Bd, weight % | 0.00% | 0.74% | 2.96% | 5.93% |
| Ni Catalyst | NiOB | NiOB | NiOB | NiOB |
| mmol/phgm | 0.05 | 0.05 | 0.05 | 0.05 |
| Al: Ni | 25 | 25 | 25 | 25 |
| B: Al | 1.1 | 1.1 | 1.1 | 1.1 |
| RXN Temperature, ° C. | 80 | 80 | 80 | 80 |
| RXN Time, min | 40 | 40 | 40 | 40 |
| Conversion, % | 94.0% | 94.7% | 92.2% | 91.1% |
| ML1 + 4 @ 100° C. | 42.7 | 35.8 | 27.2 | 18.8 |
| T80 | 5.12 | 4.54 | 3.66 | 3.04 |
| GPC Analysis | | | | |
| Mn | 73,550 | 71,294 | 61,585 | 52,430 |
| Mw | 341,996 | 312,260 | 275,360 | 243,176 |
| Mp | 220,474 | 202,400 | 170,768 | 116,446 |
| Mw/Mn | 4.65 | 4.38 | 4.47 | 4.64 |
| Microstructure (FT-IR) | | | | |
| cis-1,4; % | 96.02% | 95.91% | 95.78% | 95.69% |
| trans-1,4; % | 1.68% | 1.74% | 1.87% | 1.97% |
| Vinyl, % | 2.29% | 2.35% | 2.35% | 2.34% |

Examples 15-17, as show in Table 5, show that the addition of 4-tert-butylstyrene in increasing amounts results in a decrease in the Mooney viscosity of the polymer, including as compared to Comparative Example 14. The Mooney viscosity of Example 15 is 84% of the Mooney viscosity of Example 14.

Example 18 (Comparative)

To a dry bottle purged with nitrogen was added a hexane and 1,3-butadiene (Bd) blend in hexane, resulting in 300 grams of 15.0 weight % Bd hexane solution. To this solution was charged a preformed solution mixed in the order of 0.75 mL Bd solution (21.3 weight % Bd in hexane), 0.83 mL triisobutylaluminum (TIBA) solution (0.68 M), and 0.45 mL nickel boroacylate (NiOB) solution (0.050 M). Then boron trifluoride hexanol solution (1.0 M, 0.62 mL) was added to the bottle. The bottle was placed in an 80° C. water-bath for 40 minutes. Then, the reaction mixture was treated with isopropanol containing 2,6-di-tert-butyl-4-methylphenol (BHT) in order to deactivate the catalyst, coagulate and stabilize the polymers. The polybutadiene was then dried in a drum-dryer at 120° C. The polymer properties are listed in Table 1.

Examples 19-21

The experiments of Examples 19-21 were carried out as in Example 18 except that differing amounts of α-methylstyrene were added before addition of the catalyst components, as shown in Table 6 and FIG. 4.

TABLE 6

| | Examples | | | |
|---|---|---|---|---|
| | 18 | 19 | 20 | 21 |
| α-Methylstyrene: Bd, mole % | 0.00% | 0.25% | 1.00% | 2.00% |
| α-Methylstyrene: Bd, weight % | 0.00% | 0.55% | 2.18% | 4.37% |
| Ni Catalyst | NiOB | NiOB | NiOB | NiOB |
| mmol/phgm | 0.05 | 0.05 | 0.05 | 0.05 |
| Al: Ni | 25 | 25 | 25 | 25 |
| B: Al | 1.1 | 1.1 | 1.1 | 1.1 |
| RXN Temperature, ° C. | 80 | 80 | 80 | 80 |
| RXN Time, min | 40 | 40 | 40 | 40 |
| Conversion, % | 93.1% | 92.9% | 92.9% | 92.2% |
| ML1 + 4 @ 100° C. | 45.6 | 41.2 | 31.4 | 24.0 |
| T80 | 5.38 | 4.76 | 3.73 | 3.00 |
| GPC Analysis | | | | |
| Mn | 73,100 | 78,421 | 65,755 | 62,551 |
| Mw | 334,801 | 313,637 | 266,691 | 242,983 |
| Mp | 222,314 | 213,360 | 185,914 | 158,531 |
| Mw/Mn | 4.58 | 4.00 | 4.06 | 3.88 |
| Microstructure (FT-IR) | | | | |
| cis-1,4; % | 96.05% | 96.05% | 95.95% | 95.90% |
| trans-1,4; % | 1.68% | 1.67% | 1.72% | 1.77% |
| Vinyl, % | 2.27% | 2.28% | 2.32% | 2.33% |

Examples 19-21, as show in Table 6, show that the addition of 4-tert-butylstyrene in increasing amounts results in a decrease in the Mooney viscosity of the polymer, including as compared to Comparative Example 18. The Mooney viscosity of Example 19 is 90% of the Mooney viscosity of Example 18. The Mooney viscosity of Example 20 is 69% of the Mooney viscosity of Example 19.

While various aspects and embodiments have been disclosed herein, other aspects and embodiments will be apparent to those skilled in the art. The various aspects and embodiments or examples disclosed herein are for purposes of illustration and are not intended to be limiting, with the true scope and spirit being indicated by the following claims.

What is claimed is:

1. A solution or bulk polymerization process for preparing a high-cis polydiene having a cis-1,4-linkage content of 90% or greater comprising:
   providing at least one conjugated diene monomer containing less than 20 carbon atoms;
   providing at least one vinyl aromatic compound in a total amount of 0.01 to 2 mole % per mole of total conjugated diene monomer;
   providing a catalyst system consisting of (a) a nickel compound, optionally in combination with an alcohol, (b) an organoaluminum, organomagnesium, organozinc compound, or a combination thereof, and (c) a fluorine-containing compound or a complex thereof, wherein one or a mixture of organic solvents optionally serve to dissolve the catalyst system or serve as a carrier for the catalyst system; and
   mixing the at least one conjugated diene monomer with the at least one vinyl aromatic compound and the catalyst system to form a polymerization mixture wherein the resulting high-cis polydiene has a mooney viscosity between 30 and 55 and contains no more than 0.8 mole % of vinyl aromatic compound per mole of monomer contained within the high-cis polydiene.

2. The process of claim 1, wherein the at least one vinyl aromatic compound is selected from the group consisting of: styrene, alpha-methyl styrene, 2-methyl styrene, 3-methyl styrene, 4-methyl styrene, 4-tertbutyl styrene, 4-alpha-dimethyl styrene, alpha-phenyl styrene, styrene derivatives containing a para-ether linkage wherein the styrene derivatives contain no more than 20 carbon atoms, and mixtures thereof and the at least one conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof.

3. The process of claim 1, wherein said high-cis polydiene has a mooney viscosity between 40 and 50.

4. The process of claim 1, wherein said high-cis polydiene has a Mw between 250,000 and 450,000 and a Mn between 50,000 and 150,000.

5. The process of claim 1, wherein said high-cis polydiene has a Mw/Mn ratio between 3 and 6.

6. The process of claim 1, wherein said high-cis polydiene has a cis bond content of at least 95%.

7. The process of claim 1, wherein said catalyst system is present in an amount of 0.01 to 0.2 mmol Ni/phgm, the molar ratio of catalyst compound (b) to catalyst compound (a) is 5:1 to 100:1 and the molar ratio of catalyst compound (c) to catalyst compound (a) is 4:1 to 150:1.

8. The process of claim 1, wherein said catalyst system is preformed prior to being mixed with the conjugated diene monomer.

9. The process of claim 1, wherein the catalyst system is formed in situ by adding the (a), (b) and (c) compounds to a solution comprising the at least one vinyl aromatic compound and the at least one conjugated diene monomer.

10. The process of claim 1, wherein the catalyst system is formed by first adding the (a), (b) and (c) compounds to a solution containing the at least one vinyl aromatic compound to form a mixture and then adding the mixture to a solution containing the at least one conjugated diene monomer.

11. The process of claim 1, wherein the catalyst system is formed by first adding the (a), (b) and (c) compounds to a solution containing a portion of the at least one conjugated diene monomer to form a mixture and then adding the mixture to a solution containing the remainder of the at least one conjugated diene monomer and the at least one vinyl aromatic compound.

12. The process of claim 1, wherein the catalyst system is formed by first mixing the (a) and (b) compounds to form a mixture, adding the mixture to a solution containing the at least one conjugated diene monomer and the at least one vinyl aromatic compound to form a second mixture, and adding the catalyst compound (c) to the solution containing the at least one conjugated diene monomer and the at least one vinyl aromatic compound either along with the mixture or after the mixture.

13. The process of claim 1, wherein the polymerization mixture includes at least 20% by weight of solvent based upon the total weight of the polymerization system and said solvent includes an aliphatic solvent.

14. The process of claim 1, wherein the polymerization mixture includes less than 20% by weight of solvent based on the total weight of the polymerization mixture.

15. The process of claim 1, wherein the polymerization mixture is substantially devoid of solvent other than the at least one conjugated diene monomer.

16. The process of claim 1, wherein the process is conducted in single or multiple batches.

17. The process of claim 1, wherein the at least one conjugated diene monomer containing less than 20 atoms comprises 1,3-butadiene and the at least one vinyl aromatic compound is selected from the group consisting of styrene, methyl styrene, tertbutyl styrene, and mixtures thereof.

18. A solution or bulk polymerization process for preparing a high-cis polydiene having a cis-1,4-linkage content of 90% or greater comprising:
   providing at least one conjugated diene monomer containing less than 20 carbon atoms;
   providing at least one vinyl aromatic compound in a total amount of 0.01 to 2 mole % per mole of total conjugated diene monomer;
   providing a catalyst system consisting of (a) a nickel compound, optionally in combination with an alcohol, (b) an organoaluminum, organomagnesium, organozinc compound, or a combination thereof, and (c) a fluorine-containing compound or a complex thereof, wherein one or a mixture of organic solvents optionally serve to dissolve the catalyst system or serve as a carrier for the catalyst system; and
   mixing the at least one conjugated diene monomer with the at least one vinyl aromatic compound and the catalyst system to form a polymerization mixture wherein the resulting high-cis polydiene has a mooney viscosity between 30 and 55 and contains no more than 0.8 mole % of vinyl aromatic compound per mole of monomer contained within the high-cis polydiene, wherein the at least one conjugated diene monomer containing less than 20 atoms comprises 1,3-butadiene and the at least one vinyl aromatic compound is selected from the group consisting of styrene, methyl styrene, tertbutyl styrene, and mixtures thereof.

19. The process of claim 18, wherein said high-cis polydiene meets one or more of the following:
   a. has a cis bond content of at least 95%;
   b. has a Mw/Mn ratio between 3 and 6; and
   c. has a Mw between 250,000 and 450,000 and an Mn between 50,000 and 150,000.

20. The process of claim 18, wherein said catalyst system is present in an amount of 0.01 to 0.2 mmol Ni/phgm, the molar ratio of catalyst compound (b) to catalyst compound (a) is 5:1 to 100:1 and the molar ratio of catalyst compound (c) to catalyst compound (a) is 4:1 to 150:1.

21. The process of claim 18, wherein batch polymerization is utilized to obtain the high-cis polybutadiene.

22. The process of claim 18, wherein continuous polymerization is utilized to obtain the high-cis polybutadiene.

23. The process of claim 18, wherein the polymerization process is a solution process and the at least one conjugated diene monomer comprises 1,3-butadiene monomer in solvent.

24. A solution or bulk polymerization process for preparing a high-cis polybutadiene having a cis-1,4-linkage content of 90 to about 97% comprising:
   providing 1,3-butadiene monomer;
   providing at least one vinyl aromatic compound in a total amount of 0.01 to 2 mole % per mole of 1,3-butadiene monomer;
   providing a catalyst system consisting of (a) a nickel compound, optionally in combination with an alcohol, (b) an organoaluminum, organomagnesium, organozinc compound, or a combination thereof, and (c) a fluorine-containing compound or a complex thereof, wherein one or a mixture of organic solvents optionally serve to dissolve the catalyst system or serve as a carrier for the catalyst system; and
   mixing the at least one conjugated diene monomer with the at least one vinyl aromatic compound and the catalyst system to form a polymerization mixture wherein the resulting high-cis polydiene has a mooney viscosity between 30 and 55 and contains no more than 0.8 mole % of vinyl aromatic compound per mole of monomer contained within the high-cis polydiene,
   wherein the at least one conjugated diene monomer containing less than 20 atoms comprises 1,3-butadiene and the at least one vinyl aromatic compound is selected from the group consisting of styrene, methyl styrene, tertbutyl styrene, and mixtures thereof.

25. The process of claim 24, wherein the temperature of polymerization ranges between 20-120° C.

26. The process of claim 24, wherein said high-cis polydiene has a cis bond content of at least 95%.

27. The process of claim 24, wherein said catalyst system is present in an amount of 0.01 to 0.2 mmol Ni/phgm, the molar ratio of catalyst compound (b) to catalyst compound (a) is 5:1 to 100:1 and the molar ratio of catalyst compound (c) to catalyst compound (a) is 4:1 to 150:1.

28. The process of claim 18, wherein the catalyst system is formed by one of the following methods:
   a. in situ by adding the (a), (b) and (c) compounds to a solution comprising the at least one vinyl aromatic compound and the at least one conjugated diene monomer;
   b. by first adding the (a), (b) and (c) compounds to a solution containing the at least one vinyl aromatic compound to form a mixture and then adding the mixture to a solution containing the at least one conjugated diene monomer;
   c. by first adding the (a), (b) and (c) compounds to a solution containing a portion of the at least one conjugated diene monomer to form a mixture and then adding the mixture to a solution containing the remainder of the at least one conjugated diene monomer and the at least one vinyl aromatic compound; or
   d. by first mixing the (a) and (b) compounds to form a mixture, adding the mixture to a solution containing the at least one conjugated diene monomer and the at least one vinyl aromatic compound to form a second mixture, and adding the catalyst compound (c) to the solution containing the at least one conjugated diene monomer and the at least one vinyl aromatic compound either along with the mixture or after the mixture.

29. The process of claim 24, wherein the catalyst system is formed by one of the following methods:
   a. in situ by adding the (a), (b) and (c) compounds to a solution comprising the at least one vinyl aromatic compound and the 1,3-butadiene monomer;
   b. by first adding the (a), (b) and (c) compounds to a solution containing the at least one vinyl aromatic compound to form a mixture and then adding the mixture to a solution containing the 1,3-butadiene monomer;
   c. by first adding the (a), (b) and (c) compounds to a solution containing a portion of the 1,3-butadiene monomer to form a mixture and then adding the mixture to a solution containing the remainder of the 1,3-butadiene monomer and the at least one vinyl aromatic compound; or
   d. by first mixing the (a) and (b) compounds to form a mixture, adding the mixture to a solution containing the 1,3-butadiene monomer and the at least one vinyl aromatic compound to form a second mixture, and adding the catalyst compound (c) to the solution containing the 1,3-butadiene monomer and the at least one vinyl aromatic compound either along with the mixture or after the mixture.

30. The process of claim 1, wherein the nickel compound (a) is selected from the group consisting of nickel carboxylates, nickel carboxylate borates, nickel organophosphates, nickel organophosphonates, nickel organophosphinates, nickel carbamates, nickel dithiocarbamates, nickel xanthanates, nickel beta-diketonates, nickel alkoxides, nickel aryloxides, nickel halides, nickel pseudo-halides, nickel oxyhalides, bis nickel organonickel compounds, and combinations thereof.

31. The process of claim 18, wherein the nickel compound (a) is selected from the group consisting of nickel carboxylates, nickel carboxylate borates, nickel organophosphates, nickel organophosphonates, nickel organophosphinates, nickel carbamates, nickel dithiocarbamates, nickel xanthanates, nickel beta-diketonates, nickel alkoxides, nickel aryloxides, nickel halides, nickel pseudo-halides, nickel oxyhalides, bis nickel organonickel compounds, and combinations thereof.

* * * * *